United States Patent [19]
Grosspietsch et al.

[11] Patent Number: 5,908,097
[45] Date of Patent: Jun. 1, 1999

[54] FRICTION CLUTCH ASSEMBLY WITH A DEVICE FOR INDICATING WEAR ON A FRICTION CLUTCH AND A DEVICE FOR INDICATING WEAR ON A FRICTION CLUTCH FOR A FRICTION CLUTCH ASSEMBLY

[75] Inventors: Wolfgang Grosspietsch, Schweinfurt; Günter Neugebauer, Schonungen, both of Germany

[73] Assignee: Mannesmann Sachs, Schweinfurt, Germany

[21] Appl. No.: 08/932,991

[22] Filed: Sep. 18, 1997

[30] Foreign Application Priority Data

Sep. 18, 1996 [DE] Germany .......................... 196 37 903

[51] Int. Cl.⁶ .............................. F16D 13/50; F16D 25/08
[52] U.S. Cl. ....................................... 192/91 A; 192/30 W
[58] Field of Search .......................... 192/30 W, DIG. 1, 192/91 A; 188/1.11 W; 116/208

[56] References Cited

U.S. PATENT DOCUMENTS

| | | | |
|---|---|---|---|
| 4,452,349 | 6/1984 | Tscheplak | 192/30 W |
| 4,949,827 | 8/1990 | Leigh-Monstevens et al. | 192/91 A X |
| 5,238,093 | 8/1993 | Campbell | 192/30 W |
| 5,730,268 | 3/1998 | Villata | 192/30 W X |

FOREIGN PATENT DOCUMENTS

| | | |
|---|---|---|
| 2174169 | 10/1986 | United Kingdom . |
| 9509311 | 4/1995 | WIPO . |
| 9518314 | 7/1995 | WIPO . |

*Primary Examiner*—Rodney H. Bonck
*Attorney, Agent, or Firm*—Nils H. Ljungman & Associates

[57] ABSTRACT

A wear indicator for a friction clutch which is located in the drive train in a housing between an engine and a transmission. The wear indicator includes a marking which is stationary relative to the housing during operation of the friction clutch, and a marking which is movable during the engagement and/or disengagement movement of the clutch during operation. When observed in a pre-determined limit position, in particular when the clutch is engaged or released as far as possible, the two markings move closer to one another as clutch wear increases. A distance between the two markings which has been essentially reduced to zero indicates that the clutch has reached its maximum allowable wear. It thus becomes possible to easily and unambiguously check the wear of the clutch, even in situations were access to the clutch is difficult.

13 Claims, 6 Drawing Sheets

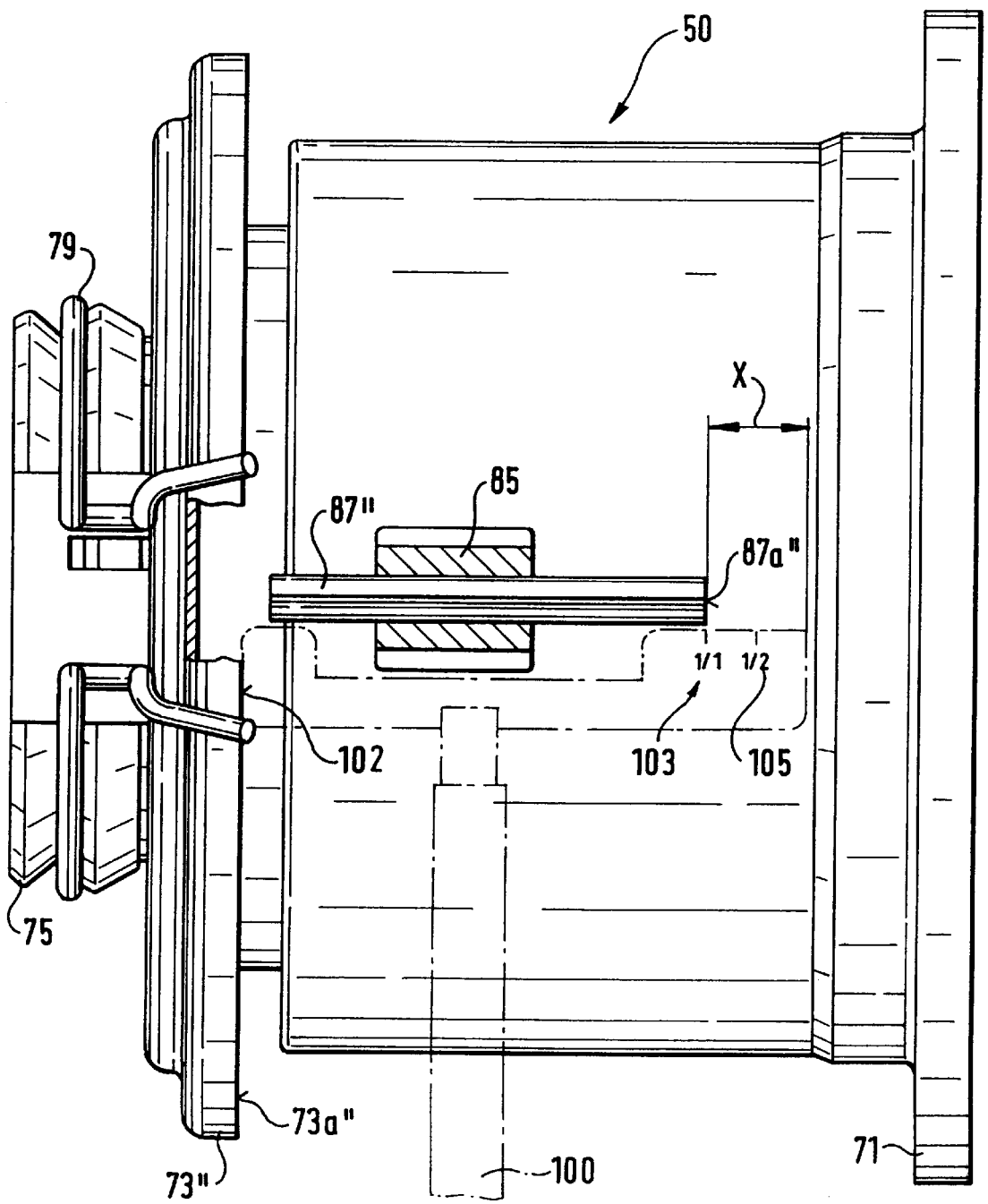

FRICTION CLUTCH ASSEMBLY WITH A DEVICE FOR INDICATING WEAR ON A FRICTION CLUTCH AND A DEVICE FOR INDICATING WEAR ON A FRICTION CLUTCH FOR A FRICTION CLUTCH ASSEMBLY

BACKGROUND OF THE INVENTION

1. Field of the Invention

The present invention generally relates to a device for indicating the wear of a friction clutch which is located in the drive train of a motor vehicle between its engine and its transmission, which friction clutch, including a release system which can be moved by an actuator mechanism between two defined limit positions relative to the transmission, is enclosed by a housing which is stationary relative to the transmission.

2. Background Information

WO 95/09311 discloses a device of the type described above in which an indicator element, which indicator element is coupled to the release piston of a release piston cylinder unit oriented coaxial to the clutch, projects outward through an opening in the housing. The back-and-forth movement of the release piston is indicated on the outside of the housing. However, the magnitude of the movement of the display element does not indicate directly, or not without a more exact measurement, whether the clutch is completely worn or not.

Friction clutches are used in motor vehicles as starter clutches or as lock-up clutches for hydraulic torque converters and are located between the internal combustion engine and the downstream transmission of the motor vehicle. For maintenance purposes, the service technician must be able to quickly and easily determine the extent to which the clutch is worn, even under the less-than-favorable and cramped conditions it which the clutch is installed, and in which conditions clear and unobstructed visibility is difficult. In particular, the technician must be able to determine whether the clutch has become worn to the point where it must be replaced. The device described in WO 95/09311 indicates only the relative wear condition. To determine whether the clutch has or has not reached the maximum allowable wear limit, the service technician must either measure the inclination of the indicator element relative to the surface of the housing, although that can be extremely difficult given the cramped and inaccessible conditions in which the clutch housing is installed, or the wear must be indicated by using an electrical display which is connected to the indicator element. The electrical indicator is complex and expensive.

OBJECT OF THE INVENTION

The object of the invention is therefore to create a device to indicate the wear of a friction clutch which essentially makes it possible to rapidly and unambiguously determine the wear of the clutch, in particular whether the clutch has reached the maximum allowable wear.

SUMMARY OF THE INVENTION

The above object can be accomplished by the utilization of two marking elements, a first marking element which defines a specified position relative to the transmission, and a second marking element which defines a specified position relative to the release system. These positions are designed such that when the friction clutch becomes worn, the position defined by the second marking element moves toward the position defined by the first marking element. Further, the distance between the positions defined by the marking elements in one of the two limit positions when the friction clutch is new, is sized so that it is essentially equal to the movement or travel of the release system when the clutch has reached the maximum allowable wear, and when the friction clutch is at its maximum allowable wear, the distance between the positions defined by the marking elements in this limit position is essentially equal to zero.

To further explain, and in accordance with one embodiment, the wear indicator comprises two marking elements, a first marking element which defines a first position preferably essentially stationary relative to the transmission and a second marking element which defines a second position preferably essentially stationary relative to the movement of a release system. In at least one embodiment, this release system may include a release bearing which contacts the radially inner area of a diaphragm spring, which diaphragm spring biases the pressure plate of a friction clutch. This release system may be moved in response to an actuator system which is operatively connected to the clutch pedal of a motor vehicle. This release system has an initial position upon the friction clutch being in a new condition. As wear occurs, the position of this release system can change in response to this wear, until a final position of the release system results when a clutch has reached a condition of maximum allowable wear. The distance between the initial position of the release system and the final position of the release system is a certain defined distance, depending upon the design of the clutch, equal to the movement which the release system has undergone once the clutch has reached the maximum allowable wear. That is, the maximum allowable wear travel of the clutch, in accordance with one embodiment, equals the maximum movement of the radially inner area of the diaphragm spring which can occur in response to wear of the clutch (e.g., friction lining wear), which corresponds to the movement of the release system, or release bearing. The first and second marking elements can be disposed in essentially predetermined positions, such that the initial distance between these elements, when the clutch is in a new condition, essentially equals the distance defined by or corresponding to the movement of the release system from its initial position when the clutch is in a new condition, and its final position when the clutch is in a maximum allowable wear condition. These marking positions are designed such that when the friction clutch becomes worn, the position defined by the second marking element, in response to the movement of the release system, moves toward the position defined by the first marking element. When the friction clutch is at its maximum allowable wear, the distance between the two marking elements has been reduced to essentially zero.

In a possible embodiment of the present invention, the movement of the release system can be the relative change in position of the release system from the engaged position when the clutch is new to the engaged position of the release system when the clutch is worn and in a condition of maximum allowable wear. In another possible embodiment of the present invention, the movement of the release system can be the relative change in position of the release system from the released position when the clutch is new, to the released position of the release system when the clutch is worn and in a condition of maximum allowable wear.

The wear is checked simply by determining the distance between the positions of the two marking elements. If there is a distance between the two marking elements, the clutch is still operational; if the distance has been reduced essentially to zero, the clutch is worn and must be replaced. No further measurement of the distance is necessary, because a distance which has been reduced essentially to zero can be immediately determined even without a measurement, in particular by a visual inspection. There is no need for an electrical indicator, although the use of such an indicator as an accessory is still possible.

To calibrate the distance, at least one of the marking elements, in particular the first marking element, can be adjusted in the direction of movement of the release system, and can be locked in position for the operation of the clutch.

In that case, the marking element can be guided so that it moves in the direction of movement of the release system, and can be frictionally locked in position.

To facilitate the calibration, there is preferably a fixed stop preferably on one of the two marking elements, in particular on the first marking element, and there is a second stop which is stationary relative to the other of the two marking elements, in particular relative to the release system, which second stop, when the friction clutch is new, can be supported in one of the two limit positions for the calibration of the distance between the two marking elements directly, or by means of a spacer element which can be removed when the clutch is in operation. In that case, the spacer element can be detachably fastened to the housing or to the pre-assembled release system, for example.

Preferably, the one marking element comprises a stop by means of which, when the housing is installed on the clutch, or on the occasion of the first release movement of the clutch, the first marking element is automatically adjusted to set the distance relative to the other marking element.

Consequently, as early as during the installation of the housing on the clutch, for example during the manufacturing process or on the occasion of a replacement of the clutch during service, the positions of the markings can be set at a distance from one another, taking the manufacturing and installation tolerances into consideration, which corresponds to the maximum allowable wear travel of the clutch. There is no need for recalibration. This measure essentially guarantees that the distance between the two markings, when it has been reduced essentially to zero, will indicate the maximum wear of the clutch with a high degree of accuracy.

The device in accordance with the invention is theoretically independent of the type of actuator mechanism used in the clutch, such as a purely mechanical actuator or a hydraulic actuator, and the device can also be installed both inside the housing and outside the housing. The advantages offered by the invention can be utilized to a particularly high degree, however, in connection with a hydraulic release piston-cylinder unit which is attached coaxially to the clutch, because the hydraulic release piston-cylinder unit is difficult to install under the cramped conditions inside the housing, and therefore a verification from outside, of the position of the release piston, which is a function of the clutch wear, is difficult to perform from outside the clutch.

The clutch in question can be a pushed clutch, in which the release piston-cylinder unit releases the clutch when the piston is extended toward the internal combustion engine. In that case, the device is preferably realized so that when there is maximum wear on the engaged clutch, the distance between the positions defined by the marking elements is essentially equal to zero.

In this case, the first marking element can be realized in the form of a pin which extends in the direction of movement of the release system, toward which a spacer element which is supported on the second marking element can be displaced in response to the movement of the installation of the housing on the clutch, and a painted line produced by applying paint on the pin and then removing the spacer element defines the position of the first marking element. The length of the spacer element can equal the above-mentioned distance.

The second marking element can be provided on a protective cap which covers a portion of the release piston which is extended out of the release cylinder.

Alternatively, the spacer element itself, which must be removed after the installation, can be used to form the marker. This spacer element is displaced on the pin in response to the movement of installing the housing on the clutch. Then paint is applied on the pin next to the spacer element and the spacer element is removed. The painted line which is produced when the spacer element, which partly covers the pin, is removed then marks the one marking position. The invention also relates to a method for the attachment or installation of such a marking element.

The wear indicator in accordance with the invention can also be used in a pulled clutch, in which the release piston releases the clutch by moving away from the engine. The wear status is preferably measured when the clutch is released.

The second marking element can be in contact against a surface corresponding to the piston by means of a bias generated by a spring, or the slide can be fastened to this surface, e.g. by means of rivets.

If, on a pulled clutch, the wear status is to be measured when the clutch is released, the first marking element, for its part, can be attached movably in a lug or eye on the housing, in particular on the release cylinder. The first time the clutch is released, the first marking element is displaced so that the distance by which the second marking element extends beyond the first marking element on the side farther from the internal combustion engine corresponds to the maximum wear of the clutch. The first marking element is frictionally locked in the lug on the housing, so that when the clutch is activated again, it does not move any further toward the second marking element. This configuration makes possible a precise automatic setting of the distance between the marking elements to the maximum wear distance, possibly also taking into consideration any manufacturing and installation tolerances of the clutch and of the release piston-cylinder unit.

During the installation of the release cylinder on the pulled clutch, the release cylinder must engage the clutch from behind, in particular a central opening of a clutch membrane spring, on the side facing away from the release cylinder, to be able to release the clutch by pulling. For this purpose, the release cylinder can have on its end an annular spring or spring washer which is biased radially outward, which annular spring is pushed under compression through the central opening of the membrane spring when the release cylinder is installed on the clutch. In this case, the release piston is pushed into the release cylinder, which can influence the initial setting of the distance between the two wear markings. To prevent this influence, at least one dowel pin can be mounted on the release cylinder so that the dowel pin can be held friction-tight so that it can move in the axial direction of the clutch, whereby the dowel pin is supported during the installation process on the clutch in the release direction against the axial forces which are exerted during installation.

Alternatively, it is also possible to provide only the dowel pin on the release cylinder, whereby the first time the pulled clutch is released, the dowel pin assumes a position relative to the release piston which already takes into consideration the manufacturing and installation tolerances of the clutch and of the release cylinder. The distance between, for example, the end surface of the dowel pin farther from the clutch and a reference contact surface on the release piston can be defined directly as a function of the design of the release mechanism, or can be determined by using a measurement gauge which is inserted during the inspection for wear through a housing opening between the reference contact surface of the piston and the end surface of the dowel pin. There can be a scale on the gauge. At the position on the scale which corresponds to the complete wear of the clutch, there can be a marking surface which, when the clutch is fully worn, is aligned with the end surface of the dowel pin. The invention also relates to a method for the measurement of wear by means of this gauge.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below on the basis of the embodiments illustrated in the accompanying drawings, in which:

FIG. 5 shows an additional variant of the embodiment illustrated in FIG. 3.

DESCRIPTION OF THE PREFERRED EMBODIMENT

Figure 1:
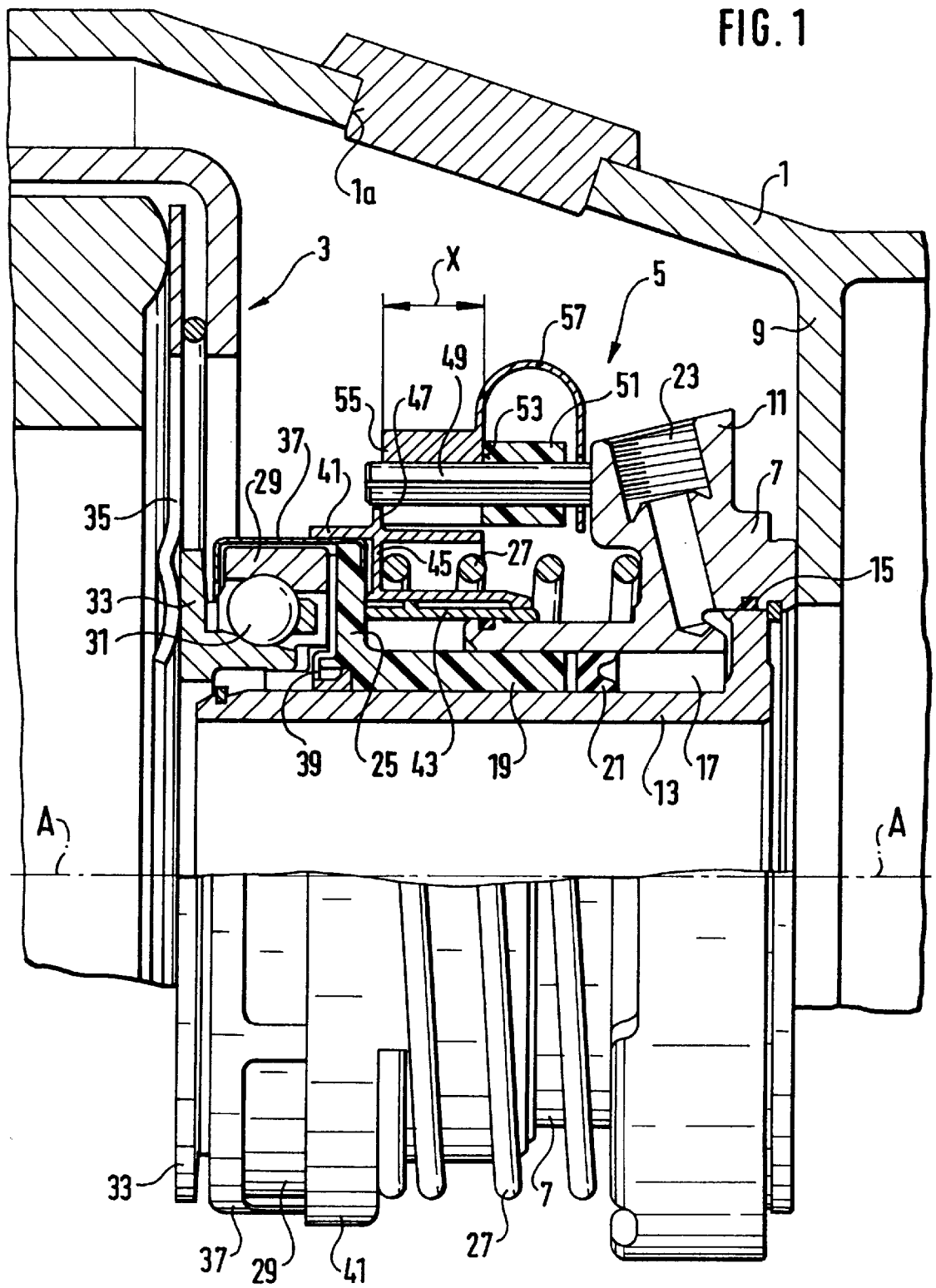
FIG. 1 shows a partial section which includes the axis through a first embodiment of the indicator apparatus on a release cylinder which is oriented concentrically to a pushed clutch.
Figure 1A:
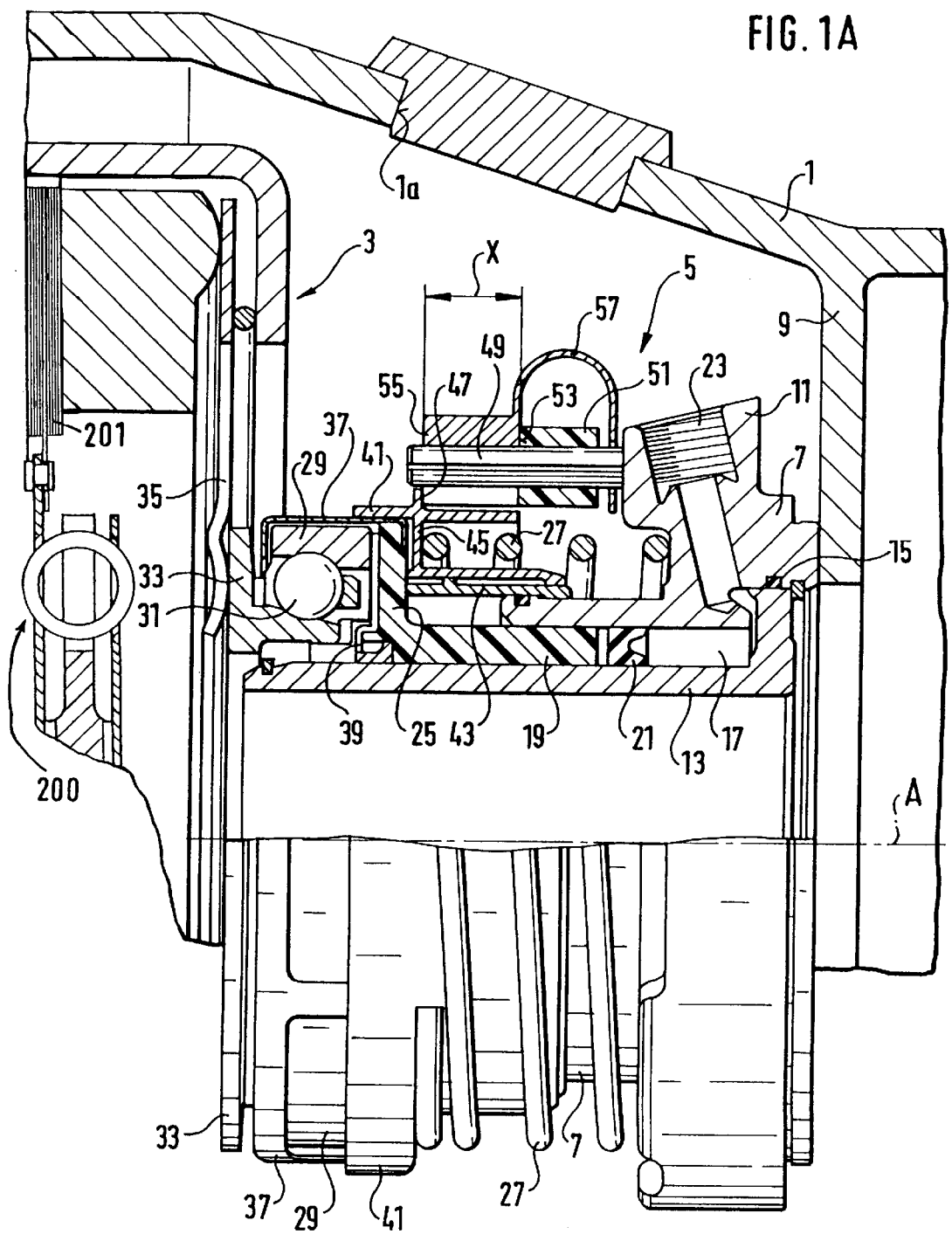
FIG. 1A shows the embodiment of FIG. 1, including a clutch disc.

With reference to FIG. 1, in a clutch bell or housing 1 between an internal combustion engine (not shown, to the left in FIG. 1) and a transmission (not shown, to the right in FIG. 1), there is a friction clutch 3 which connects a crankshaft of the engine on a common axis A—A to an input shaft of the transmission. In accordance with one embodiment shown in FIG. 1A, the friction clutch 3 can include a clutch disc 200 having friction linings 201. Coaxial to the axis A—A, between the friction clutch 3 and the clutch housing 1, there is a hydraulic release cylinder 5. In this case, the cylinder 7 of this release cylinder 5 is bolted to a wall 9 of the clutch housing 1 farther from the clutch. The cylinder comprises an outer cylinder carrier 11 and an inner cylinder tube 13. The cylinder carrier 11 and the cylinder tube 13 are sealed from one another by means of an O-ring 15, and radially between them there is a ring-shaped cylindrical compression chamber 17 which is open toward the clutch side, which compression chamber 17 is connected by means of an admission 23 to a hydraulic pressure source (master cylinder) (not shown). A tubular release piston 19 can move in this compression chamber 17, whereby in this case it is guided over its entire length by the cylinder tube 13. There is a pressure-tight seal in the form of a ring gasket 21 between the piston 19 and the compression chamber 17.

The clutch-side (left) end of the release piston 19 carries a flange 25 which projects radially outward. Between the flange 25 and an axially opposite surface of the cylinder carrier 11 there is a compression spring 27 which applies a bias to the piston 19 toward the clutch side. Under the action of the spring 27, the flange 25 is in contact with a non-rotating bearing ring 29 of a release ball bearing 31 which is in a dust-tight encapsulation. A bearing ring 33 of the release ball bearing 31 is in contact with a membrane spring 35 of the friction clutch. A retaining sleeve 37 makes the release bearing 31 captive, but allows it to be displaced radially on the flange 25 of the release piston 19. A pressure absorption washer 39 is located axially between the flange 25 and the bearing ring 29.

As a result of the hydraulic pressure introduced into the compression chamber 17 via the admission 23, the release piston 19 moves out of the release cylinder 7, to the left as shown in FIG. 1, and by means of the release bearing 31 pushes the membrane spring 35 toward the engine, so that the friction clutch releases (pushed clutch).

A radial outer surface of the release piston 19 which is exposed when the piston 19 moves out of the cylinder 7 is protected by two telescoping dust protector sleeves 41, 43 which can move in the axial direction. The outermost telescoping part 41 supports a flange 45 which is clamped between the spring 27 and the flange 25 of the release piston 19, and thus tracks or follows the engagement and disengagement movements of the release piston 19.

The flange 45 of the outermost dust protector sleeve 41 forms a first, movable marking 47 of the wear indicator which is described below.

Projecting axially parallel to the axis A—A from the cylinder carrier 11 is a cylindrical, radially flexible guide pin 49, whereby the pin runs at a slight distance radially outside the marker 47. On the guide pin 49, a friction-tight slide 51 moves sluggishly or stiffly, whereby the clutch-side end surface 53 of the slide 51 forms a housing-side marking, which is axially opposite the clutch-side marking 47. Between the two markers 47, 53, if necessary even before the installation of the clutch housing 1 with the release cylinder pre-installed on it, there is a template in the form of a spacer element 55 which has a specified axial length X. The spacer element 55 is detachably fastened by means of a flexible, U-shaped bracket 57 to the end farther from the clutch of the guide pin 48.

During the installation on the internal combustion engine of the unit which contains the clutch housing 1, the release cylinder 5 and the release bearing 31, whereby the clutch is pre-installed on the crankshaft of the engine, the release piston 19 is pushed in along the axis A—A against the spring 27. The release piston 19 thereby drives the outer protective sleeve 41 and its marking 47 along with it. When the clutch is engaged, the marker 47, by means of the spacer element 55, pushes the slide 51 toward the transmission, i.e. to the right as shown in FIG. 1. When the installation has been completed and the clutch is engaged, the slide 51 then sits friction-tight on the guide pin 49 so that its end surface 53, which is the fixed marking, sits axially opposite the movable marking 47 separated by the distance X. The position of the marking is a function of the respective manufacturing and installation tolerances.

The spacer 55 is then removed via a recloseable inspection opening 1a in the clutch housing 1.

Alternatively, the distance X can be set by means of a tool through the opening 1a, following the installation of the clutch housing 1.

The distance X corresponds to the maximum allowable wear travel of the friction clutch 3. As the wear on the friction clutch 3 increases, the markings 47, 53 move closer to one another—considered when the clutch is engaged. When the distance has been reduced essentially to zero, the clutch is completely worn and must be replaced. This condition can be easily determined through the inspection opening 1a. To determine whether the clutch is or is not ready for replacement, all that is necessary is to determine whether the distance between the two markings has been reduced to zero or not. It is not necessary to measure the distance between the markings. The distance which remains between the markings indicates the remaining wear travel.

In other words, in accordance with at least one embodiment of the present invention, as wear on the friction clutch 3 increases, e.g. the friction linings wear, the position of the membrane or diaphragm spring 35 and the pressure plate can be shifted axially in a direction away from the hydraulic release cylinder 5 (to the left in FIG. 1) and toward the friction linings. Thus, in accordance with one embodiment, the radially outer portion of the membrane spring 35, which outer portion can contact the pressure plate, can be shifted progressively to the left, that is, toward the friction linings, as wear increases. The membrane spring 35 can preferably "pivot" in response to this movement, that is to say, as this radially outer portion moves progressively to the left, the radially inner portion of the membrane spring 35 can simultaneously move progressively to the right, that is, toward the release cylinder 5. This rightward movement of the radially inner portion of the membrane spring 35 can thereby cause a change in position of the release bearing 31 and release piston 19, as the membrane spring 35 progressively "pivots" in response to clutch wear. This change in the positioning of the release bearing 31 and release piston 19, i.e. a rightward shift, can result in a corresponding change in the positioning of the first movable marking 47, which marking 47 can essentially track the movement of the release system. The distance "X" has been determined to essentially equal the maximum allowable wear travel of the friction clutch. That is to say, once maximum allowable wear has occurred to the clutch, and the pivoting of the membrane spring 35 has occurred as discussed above which causes a shift of the piston 19 to the right, and first marking 47 has reached its maximum allowable wear travel position, the distance between the first marking 47 and the second marking 53 should essentially equal zero when the clutch is engaged, in accordance with one embodiment.

Figure 2:
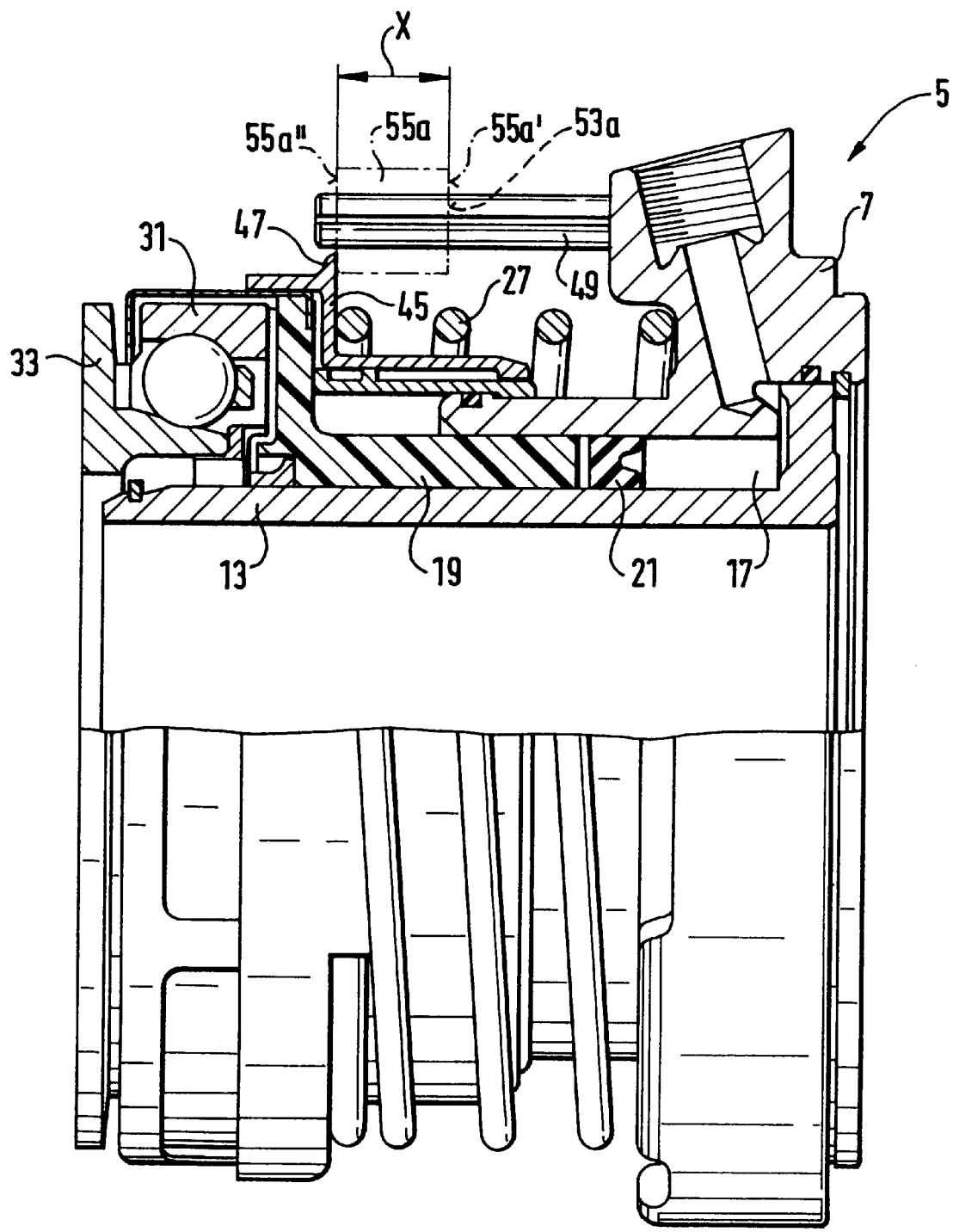
FIG. 2 shows a variant of the embodiment illustrated in FIG. 1.

FIG. 2 illustrates a variant of the wear indicator illustrated in FIG. 1 for a pushed clutch. Elements which are similar to those in the embodiment illustrated in FIG. 1 are identified by corresponding reference numbers.

Before the installation of the clutch housing with the release cylinder 5 on the internal combustion engine with a pre-installed new clutch, a spacer element 55a is placed on the guide pin 49, whereby the axial length of the spacer element 55a equals the maximum allowable wear travel X of the clutch. During the installation, the spacer element 55a is driven on its end surface 55a" by the marking 47 toward the transmission side. The end surface 55a' of the spacer element 55a facing the transmission then assumes a position on the guide pin 49 which is a function of the manufacturing and installation tolerances, and which is separated from the movable marking 49 by the wear travel X.

Paint is then applied to the guide pin 49 in the vicinity of the end surface 55a' of the spacer element 55a. The painted line 53a which is thereby produced forms the stationary marking. Then the spacer element 55a is removed through the inspection opening 1a as illustrated in FIG. 1.

Figure 3:
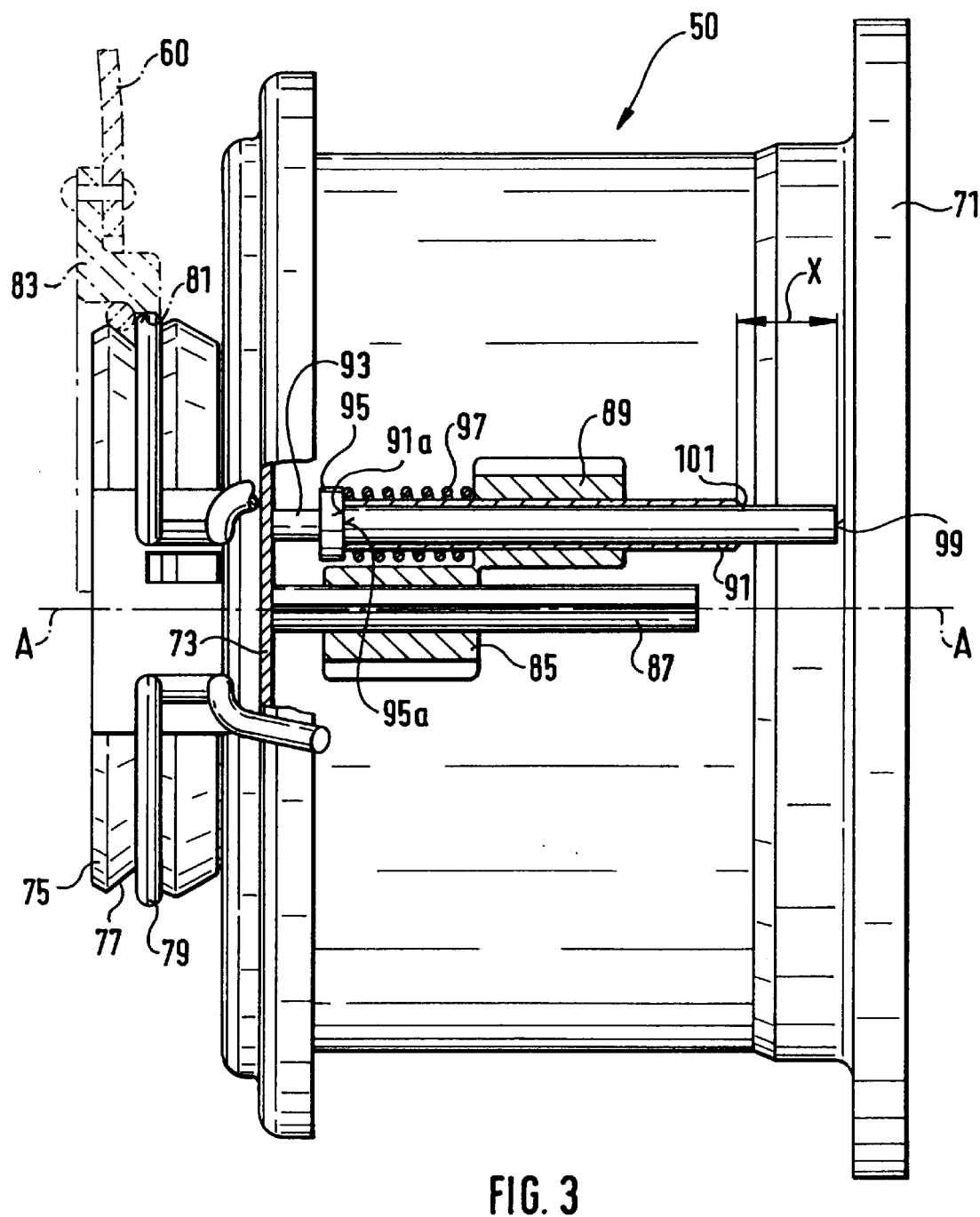
FIG. 3 shows a partial section of a second embodiment of the indicator device on a release cylinder which is oriented coaxially to a pulled clutch.

FIG. 3 shows an additional embodiment of the wear indicator for a pulled friction clutch. A release cylinder 50 is oriented coaxial to a common axis A—A of the crankshaft of an internal combustion engine (not shown, to the left in FIG. 3) and an input shaft of a downstream transmission (not shown, to the right in FIG. 3), between the clutch and the transmission. The release cylinder 50 releases the clutch by engaging the radially inside periphery of a membrane spring 60 of the clutch, and pulling it toward the transmission side, i.e. toward the right in FIG. 3.

The release cylinder 50, on its end farther from the clutch, carries a flange 71 by means of which it is to be fastened in a clutch housing. A release piston—not shown in any further detail—projects from the clutch-side open end of the release cylinder 50. The release cylinder 50 has a stop plate 73 which externally surrounds the release cylinder 50, as well as a release bearing 75 with a groove 77 in which there is an annular spring 79 which is biased radially outward.

During the installation of the clutch housing with the pre-installed release cylinder 50 plus the release bearing 75 and annular spring 79 on the internal combustion engine with the pre-installed friction clutch, the annular spring 79 is pushed through a central hole 81 of an inner flange 83 of the spring plate 60 and is thereby compressed radially. After it passes through the hole, the spring snaps behind the inner flange 83 and is thereby capable of transmitting traction forces from the release piston to the membrane spring 60, to release the clutch.

Located at a 180 degree offset on the outside periphery of the release cylinder 50 are two axial lugs 85 which are molded in one piece with the release cylinder. Radially flexible dowel pins 87 are inserted friction-tight into the lugs 85, and when the release bearing 75 with the spring 79 is inserted through the center hole 81, they support the stop plate 73 against the axial forces which are exerted.

The first time the clutch is released, the dowel pins 87 are displaced to a sufficient distance from the transmission that they do not influence the further operation of the clutch. The position of the dowel pins 87 after the first actuation of the clutch is a function of the respective tolerances. After the clutch has been replaced, the dowel pins 87 must be pushed back into the as-delivered position, extended out toward the left as shown in the figure, to make possible a repeated snapping of the spring 79 into the clutch.

On the outside periphery of the release cylinder 50 there is an additional one-piece axial lug 89, in which a guide sleeve 91 can be clamped friction-tight, but so that it moves more easily than the dowel pins 87 together. In turn, there is a sliding pin 93 in the guide sleeve 91. At some distance from its clutch-side end, the pin 93 carries a ring-shaped flange 95. A compression spring 97 is stretched between an end surface 95a of the ring-shaped flange 95 and a clutch-side end surface of the additional lug 89 and over the guide sleeve 91. The spring 97 pushes the pin 93 against the stop plate 73, so that the pin 93 follows the movements of the release piston. The axial length of the pin 93 from the end surface 95a of the flange 95 to its end 99 farther from the clutch is equal to the length of the guide sleeve 91 plus the maximum wear travel X of the clutch.

The first time the clutch is released, the end surface 95a of the flange 95 drives the guide sleeve 91 by means of its clutch-side end surface 91a. The distance the pin end surface 99 projects beyond the end 101 of the clutch sleeve 91 farther from the clutch therefore corresponds to the maximum wear travel X. The next time the clutch is engaged, the guide sleeve 91 remains held friction-tight in the lug 89. The first time the clutch is released, the guide sleeve 91 is set as a function of the respective installation tolerances. No further calibration is necessary.

As the clutch wear increases—observing the released clutch through the inspection opening 1a as illustrated in FIG. 1—the distance by which the end 99 of the pin 93 projects beyond the end 101 of the guide sleeve 91 is smaller. When the distance has been reduced essentially to zero, the clutch has become worn to its maximum limit and must be replaced.

To further explain, and in accordance with at least one embodiment of a pulled clutch, as wear to the clutch occurs, such as wear to the friction linings, the pressure plate and the membrane spring 60 can shift towards the friction linings (i.e. to the left in FIG. 3). In this embodiment, the radially inner portion of the membrane spring 60 can shift to the left in FIG. 3 when wear occurs to the friction linings. Since the radially inner portion of the membrane spring 60 can be engaged or connected with the release bearing 75 of the release cylinder 50, when the radially inner portion of the membrane spring 60 progressively shifts to the left in response to wear, the position of the release bearing 75 and stop plate 73 can also be shifted to the left. In response, the piston also moves toward the clutch or to the left. That is, the stop plate or ring 73, 73" moves progressively toward the clutch as wear to the clutch occurs. In at least one embodiment, since the sliding pin 93 is configured to remain in contact with the stop plate 73, for example, due to bias exerted by a compression spring 97, the position of pin 93 therefore tracks the movement of the stop plate 73 as wear occurs. Thus, as the clutch wear increases—observing the released clutch through the inspection opening (1a as illustrated in FIG. 1)—the distance by which the end 99 of the pin 93 projects beyond the end 101 of the guide sleeve 91 can become progressively smaller. When the distance between the end 99 of the pin 93 and the end 101 of the guide sleeve 91 has been reduced essentially to zero, the clutch has become worn to its maximum limit and must be replaced.

The function of one of the dowel pins 87 can be taken over by the pin 93 and the guide sleeve 91, but that complicates the resetting of the dowel pin following the replacement of the clutch, in particular because under some conditions, the dowel pin which projects toward the transmission interferes with access to the guide sleeve 91.

Figure 4:
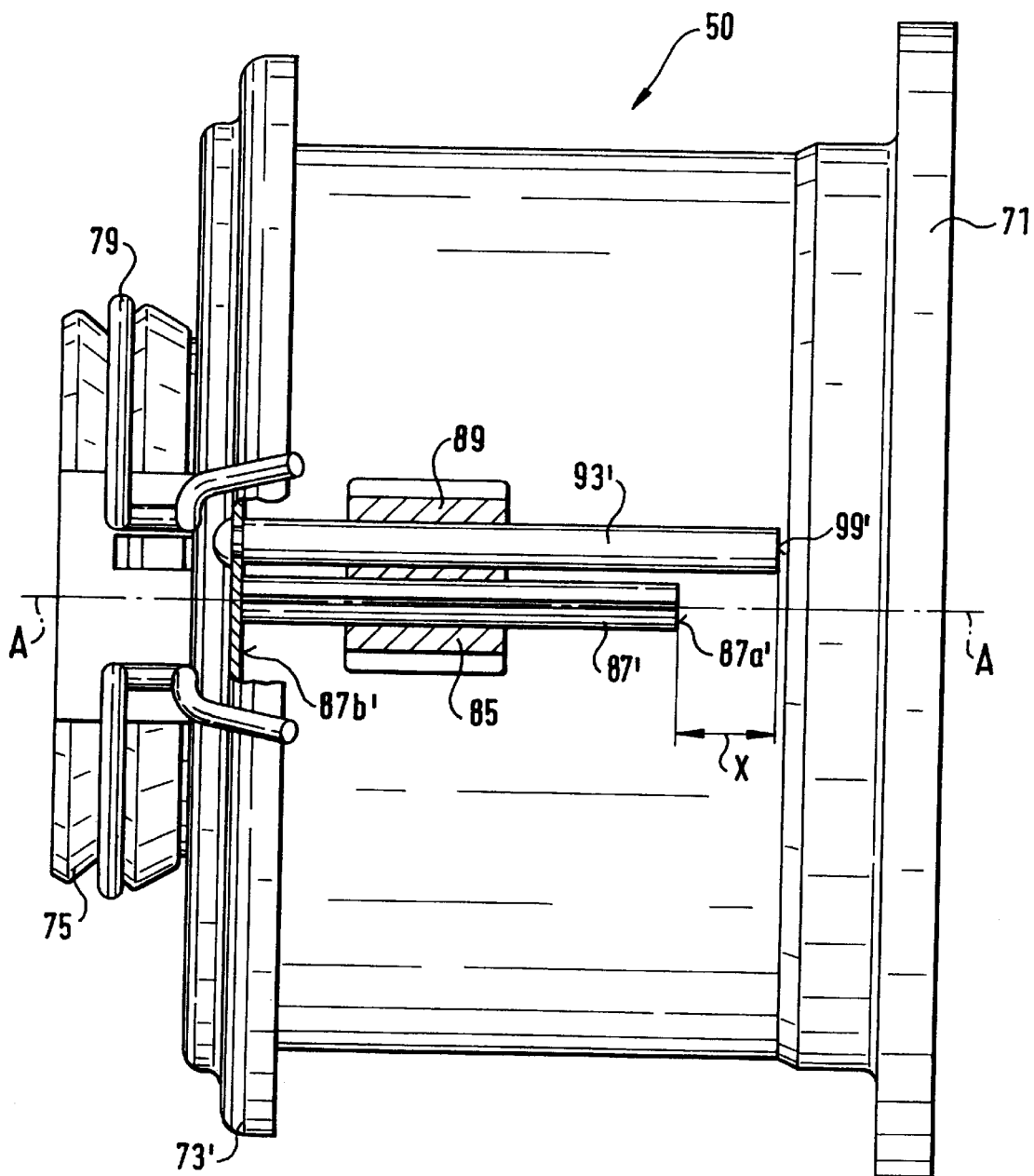
FIG. 4 shows a variant of the embodiment illustrated in FIG. 3.

FIG. 4 illustrates a variant of FIG. 3. In FIG. 4, the pin 93' is riveted to the stop ring 73' and consequently tracks or follows the release movements of the release piston. The wear distance X of the clutch corresponds to an axial distance between the end surface 99' farther from the clutch of the pin 93' and of an end surface 87a' farther from the clutch of the dowel pin 87'. When the clutch is released, a distance X which has been reduced essentially to zero indicates that the clutch is completely worn.

FIG. 5 illustrates an additional variant of FIG. 3. This embodiment omits the pin 93 and the guide sleeve 91 shown in FIG. 3. To check for wear, a gauge 100 is introduced into the housing when the clutch is released, and a clutch-side contact surface 102 of the gauge 100 is placed against the surface 73a" farther from the clutch of the stop ring 73". In the vicinity of the end 87a" farther from the clutch of the dowel pin 87", the gauge 100 has a scale 103 on which the position of the end surface 87a" of the dowel pin 87" can be read. When the end surface 87a" of the dowel pin coincides with a corresponding marking 105 on the scale 103 or a surface of the gauge which is parallel to the end surface 87a" of the gauge, that is an indication of maximum clutch wear.

One feature of the invention resides broadly in the device for indicating the wear of a friction clutch 3 which is located in the drive train of a motor vehicle between its engine and its transmission, which clutch, including a release system 31; 75 which can be moved by an actuator mechanism 5; 50 between two defined limit positions relative to the transmission, is enclosed by a housing 1 which is stationary relative to the transmission, characterized by two marking elements, a first marking element 51; 49; 91; 87'; 87" of which defines a predetermined position at 53; 53a; 101; 87a'; 87a" relative to the transmission, and a second marking element 45; 45; 93; 93', 101 defines a predetermined position at 47; 47; 97; 97', 105 relative to the release system 31; 75, such that the position at 47; 47; 99; 99'; 105 defined by the second marking element 45; 45; 93; 93'; 101 moves toward the position at 53; 53a; 101; 87a'; 87a" defined by the first marking element 51; 49; 91; 87', 87" when the clutch 3 is worn, whereby the distance X between the positions defined by the marking elements in one of the two limit positions, when the friction clutch 3 is new, is essentially equal to the distance travelled by the release system 31 when the clutch has reached its maximum allowable wear, and when the friction clutch 3 has reached its maximum wear, the distance X between the positions defined by the marking elements in this limit position is essentially equal to zero.

Another feature of the invention resides broadly in the device characterized by the fact that at least one of the marking elements, in particular the first marking element 51; 91; 87'; 87" can be adjusted in the direction of movement A—A of the release system 31; 75, and can be fixed in position for operation.

Yet another feature of the invention resides broadly in the device characterized by the fact that the marking element 51; 91; 87'; 87" is guided so that it can move in the direction of movement of the release system, and is locked in position friction-tight.

Still another feature of the invention resides broadly in the device characterized by the fact that on one of the two marking elements, in particular on the first marking element 51; 91; 87", there are a first stop 53; 91a; 87b", and a second stop 47; 95a; 73' which is stationary relative to the other of the two marking elements, in particular stationary relative to the release system 35; 75, which stops, when the friction clutch is new, can be supported on one another in the one of the two limit positions for calibration of the distance X between the two marking elements directly, or by means of a spacer element 55 which can be removed when the clutch is in operation.

A further feature of the invention resides broadly in the device characterized by the fact that the one marking element 51; 91; 87', 87" has a stop 53; 91a; 87b'; 87b", on which the distance X relative to the other marking element is set automatically by placing the housing 1 on the clutch 3 or on the occasion of the first release movement of the clutch.

Another feature of the invention resides broadly in the device characterized by the fact that the actuator mechanism comprises a release cylinder 5; 50 which is installed coaxial to the clutch, and the device is installed on the periphery of the release cylinder in the housing 1 so that the device is visible through an opening 1a in the housing 1.

Yet another feature of the invention resides broadly in the device characterized by the fact that the clutch 3 is a pushed clutch, and when the engaged clutch is worn to the maximum allowable extent, the distance X between the positions marked by the marking elements is essentially equal to zero.

Still another feature of the invention resides broadly in the device characterized by the fact that the first marking element 51, which is held in place friction-tight, can be displaced on a radially flexible dowel pin 49 which extends in the axial direction A—A of the release cylinder.

A further feature of the invention resides broadly in the device characterized by the fact that the removable spacer element 55 is secured directly or indirectly on the release cylinder 5, in particular on the dowel pin 49, by means of a bracket 57.

Another feature of the invention resides broadly in the device characterized by the fact that the second marking element 47 is realized on a protective cap 41 which externally covers a portion of the release piston 19 which is extended outside of the release cylinder 7.

Yet another feature of the invention resides broadly in the device characterized by the fact that the first marking element is realized in the form of a pin 49 which extends in the direction of movement of the release system 5, on which pin a spacer element supported on the second marking element 45 can be moved in response to the movement of placing the housing 1 on the clutch, and a painted line 53a produced by applying paint to the pin 49 and then removing the spacer element 55a defines the position of the first marking element.

Still another feature of the invention resides broadly in the device characterized by the fact that the clutch is a pulled clutch, and when the released clutch has reached the maximum allowable degree of wear, the distance X between the positions of the marking elements is essentially equal to zero.

A further feature of the invention resides broadly in the device characterized by the fact that the second marking element 93 can be moved with the release piston relative to the first marking element 91 so that when the released clutch has reached the maximum allowable degree of wear, the distance by which the second marking element 93 projects beyond the first marking element is essentially zero.

Another feature of the invention resides broadly in the device characterized by the fact that the second marking element 93 is in contact under bias applied by a spring 97 against a surface 73 which faces away from the engine and moves jointly with the piston, or the second marking element 93' is fastened to this surface.

Yet another feature of the invention resides broadly in the device characterized by the fact that the second marking element 93 can be displaced coaxially in the first marking element 91.

Still another feature of the invention resides broadly in the device characterized by the fact that the first marking element 91, for its part, can be permanently inserted against a friction-tight clamping action in an extension, in particular a lug 89 on the release cylinder 70, when the housing 1 is installed on the clutch, or on the occasion of the first release of the clutch, such that the distance by which the second marking element 93 projects beyond the first marking element 91 corresponds to the distance X.

A further feature of the invention resides broadly in the device characterized by the fact that the second marking element 93 carries a driver 95, by means of which, when the housing 1 is installed on the clutch or on the occasion of the first release of the clutch, it drives the first marking element 91 into its permanent position.

Another feature of the invention resides broadly in the device characterized by the fact that a radially biased dowel pin 87 is held on the release cylinder 70, clamped friction-tight so that it can move in the axial direction A—A of the clutch, whereby the dowel pin 87 supports the release piston during installation on the clutch in the release direction against axial forces which occur in particular when a ring-shaped release drive spring 79 which is biased radially outward is pressed through a center opening 81 of the clutch.

Yet another feature of the invention resides broadly in the device characterized by the fact that the second marking element 93' is realized in the form of a slide which is parallel to the dowel pin 87' and can move with the release piston, whereby the end surfaces 87a', 99' of the slide farther from the clutch are separated from one another by the distance X.

Still another feature of the invention resides broadly in the device characterized by the fact that the distance X between an end surface 87a" farther from the clutch of the dowel pin 87" and a marking 105 on a gauge 100 which can be applied to the released release piston at 73a" through a housing opening 1a to check for wear is essentially zero when the clutch is worn to the maximum allowable degree.

A further feature of the invention resides broadly in the method for the measurement of the wear of a friction clutch 3 located in the drive train of a motor vehicle between its engine and its transmission, which clutch, including a release system 31; 75 which can be moved by a release cylinder between two defined limit positions relative to the transmission, is enclosed by a housing 1 which is stationary relative to the transmission, comprising: The provision of a marking 87" on a marking element 87" which is stationary relative to the housing 1, Application of a gauge 100 against the release piston at 73a" through an opening 1a in the housing 1, whereby a distance X between the marking 87a" on the marking element 87" and an additional marking 105 on the applied gauge 100 is essentially equal to zero when the clutch wear has reached the maximum allowable degree, and Determination whether the marking 105 of the gauge 100 is or is not aligned with the marking 87a" of the marking element 87".

Another feature of the invention resides broadly in the method for the attachment of a marking element in a device for the indication of the wear of a friction clutch 3 located in the drive train of a motor vehicle between its engine and its transmission, which clutch, including a release system 31; 75 which can be moved by an actuator mechanism between two defined limit positions relative to the transmission, is enclosed by a housing 1 which is stationary relative to the transmission, comprising: Provision of a first marking element 49 which is stationary relative to the housing 1, Provision of a second marking element 45 which tracks the engagement and/or release movement of the clutch, Partial coverage of one 49 of the two marking elements such that, when the housing 1 is installed, an edge 55a' of the cover 55a is at a distance X from the other of the marking elements 45 which corresponds to the maximum allowable wear travel of the clutch, Application of paint on the covered marking element 49 in the vicinity of the cover 55a, Removal of the cover 55a from the one marking element 49, so that the resulting painted line 53a marks a second position, whereby the two marking elements 45, 49 are located such that the distance X between the positions defined by the marking elements in one of the two limit positions of a new friction clutch 3 is essentially equal to the movement stroke of the release system 31 at the maximum allowable wear, and when the friction clutch 3 has reached its maximum allowable wear, the distance X between the positions defined by the marking elements in this limit position is essentially equal to zero.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

Examples of friction clutches and/or actuator assemblies and components thereof which may potentially be used in conjunction with at least one embodiment of the present invention may be found in U.S. patent applications Ser. Nos. 08/531,047, 08/531,452, 08/531,451, 08/562,476, 08/594,865, 08/594,582, 08/618,174, 08/719,550, 08/800,427, 08/360,434 and 08/331,048; and in U.S. Pat. Nos.: 5,538,115, 5,464,239, 5,538,270, 5,601,165, 5,580,079, 5,573,265, 5,492,051, 5,527,061, 5,632,502, 5,575,502, 5,638,934, 5,431,268, 5,443,143, 5,620,076, 5,474,165, and 5,423,401.

Examples of wear indicators or devices having a wear indicator, components of which may potentially be used in at least one embodiment of the present invention, may be found in: U.S. Pat. Nos.: 5,403,168; 5,388,331; 5,421,561; 5,428,437; 5,439,040; 5,451,110; and 5,465,912.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 37 903.2, filed on Sep. 18, 1996, having inventors Wolfgang Grosspietsch and Günther Neugebauer, and DE-OS 196 37 903.2 and DE-PS 196 37 903.2 are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. Method for the attachment of a marking element in a device for the indication of the wear of a friction clutch located in the drive train of a motor vehicle between its engine and its transmission, which clutch, including a release system which can be moved by an actuator mechanism between two defined limit positions relative to the transmission, is enclosed by a housing which is stationary relative to the transmission, the method comprising:

provided a first marking element which is stationary relative to the housing;

providing a second marking element which tracks the engagement and/or release movement of the clutch;

determining the maximum allowable wear travel of the clutch;

partially covering with a cover of one of the two marking elements such that, when the housing is installed, an edge of the cover is at a distance from the other of the marking elements which corresponds to the maximum allowable wear travel of the clutch;

marking a line on the partially covered marking element in the vicinity of the edge of the cover;

removing of the cover from the one marking element, so that the resulting marked line marks a second position, and whereby the two marking elements are located such that the distance between the positions defined by the marking elements in one of the two limit positions of a new friction clutch is essentially equal to the movement stroke of the release system at the maximum allowable wear, and when the friction clutch has reached its maximum allowable wear, the distance between the positions defined by the marking elements in this limit position is essentially equal to zero.

2. A friction clutch assembly for a motor vehicle, said clutch assembly comprising:

a friction clutch;

said friction clutch comprising:

a clutch disc defining an axis of rotation and an axial direction parallel to the axis of rotation;

a pressure plate to apply an axially directed force to said clutch disc to engage said clutch disc with a flywheel; and a biasing device to bias said pressure plate in the axial direction;

a release system to permit the engagement and disengagement of said friction clutch;

said release system being disposed to apply force to a portion of said biasing device;

said friction clutch having a new condition upon initial installation of said friction clutch;

said friction clutch having a maximum wear condition upon the occurrence of maximum allowable wear of said friction clutch;

said release system being disposed in a first position upon said friction clutch being in said new condition;

said release system being disposed in a second position upon said friction clutch being in said maximum wear condition;

said first position of said release system and said second position of said release system defining a distance between one another;

a device to indicate the amount of wear of said friction clutch;

said wear indicating device comprising:
an element to indicate wear disposed in a first position upon said friction clutch being in said new condition;
said element being disposed in a second position upon said friction clutch being in said maximum wear condition;
said first position of said element and said second position of said element defining a distance between one another;

said distance defined by said first position and said second position of said release system being essentially equal to said distance defined by said first position and said second position of said element;

said element being a first element to indicate wear;

said wear indicating device further comprising a second element to indicate wear;

said first element and said second element having an axial distance between one another;

said first element being designed and configured to move axially toward said second element upon the occurrence of wear of said friction clutch;

said distance between said first element and said second element being essentially zero upon said friction clutch being in said maximum wear condition;

said second element being realized in the form of a pin which extends in the direction of movement of said release system;

a removable spacer element being supported on said first element and being configured and disposed to be moved on said pin in response to the movement of the installation of a housing on said friction clutch;

the position of said second element being defined by a line produced by applying a marking substance to said pin at a position indicated by said spacer element after said installation of said housing on the friction clutch; and said removable spacer element being configured and disposed to be removed subsequent to applying said marking substance to said pin.

3. A friction clutch assembly for a motor vehicle, the motor vehicle comprising a transmission, said clutch assembly comprising:

a friction clutch;
said friction clutch comprising:
a clutch disc defining an axis of rotation and an axial direction parallel to the axis of rotation;
a pressure plate to apply an axially directed force to said clutch disc to engage said clutch disc with a flywheel; and
a biasing device to bias said pressure plate in the axial direction;

a release system to permit the engagement and disengagement of said friction clutch;

said release system being disposed to apply force to a portion of said biasing device;

said friction clutch having a new condition upon initial installation of said friction clutch;

said friction clutch having a maximum wear condition upon the occurrence of maximum allowable wear of said friction clutch;

said release system being disposed in a first position upon said friction clutch being in said new condition;

said release system being disposed in a second position upon said friction clutch being in said maximum wear condition;

said first position of said release system and said second position of said release system defining a distance between one another;

a device to indicate the amount of wear of said friction clutch;

said wear indicating device comprising:
an element to indicate wear disposed in a first position upon said friction clutch being in said new condition;
said element being disposed in a second position upon said friction clutch being in said maximum wear condition;
said first position of said element and said second position of said element defining a distance between one another;

said distance defined by said first position and said second position of said release system being essentially equal to said distance defined by said first position and said second position of said element;

said element being a first element to indicate wear;

said wear indicating device further comprising a second element to indicate wear;

said first element and said second element having an axial distance between one another;

said first element being designed and configured to move axially toward said second element upon the occurrence of wear of said friction clutch;

said distance between said first element and said second element being essentially zero upon said friction clutch being in said maximum wear condition;

an actuator mechanism;

said actuator mechanism being configured and disposed to move said release system;

said second element to indicate wear defining a predetermined position relative to the transmission of the vehicle;

said first element to indicate wear defining a predetermined position relative to said release system, such that the position defined by said first element to indicate wear moves toward the position defined by said second element to indicate wear upon the occurrence of wear of said friction clutch;

said clutch assembly defining a longitudinal axis;

said release system being movable along the longitudinal axis;

at least one of said first and said second elements being initially movable and adjustable in a direction substantially parallel to the longitudinal axis;

said at least one of said first and said second elements being configured to be disposed in a fixed position after said initial adjusting;

said actuator mechanism further comprising a guide device to guide said movement of said at least one element and to frictionally lock said at least one element in said fixed position after said movement;

one of said first and second elements comprising a first stop;

said wear indicating device comprising a second stop;

said second stop being configured and disposed to be stationary relative to said release system;

said first stop and said second stop being configured and disposed to be one of a) and b):
a) supported upon one another to permit direct calibration of the distance between said first element and said second element upon said friction clutch being in said new condition, or b) separated from one another by means of a removable spacing element to permit calibration of the distance between said first element and said second element upon said friction clutch being in said new condition; and said clutch assembly comprising a housing, said housing being configured and disposed to be stationary relative to the transmission; and said one of said first and second elements comprising said first stop, is configured and disposed such that said calibration of the distance between said first and second elements is set automatically by one of: installing said housing on said friction clutch or upon the occasion of the first release movement of said friction clutch.

4. The clutch assembly according to claim 3, wherein:

said actuator mechanism comprises a release cylinder;

said release cylinder being disposed coaxial to said friction clutch upon installation of said clutch assembly;

said release cylinder comprises a periphery;

said housing having an opening;

said wear indicating device is installed within said housing on said periphery of said release cylinder to permit viewing of said wear indicating device through said opening; and said friction clutch is a pushed clutch, and upon the engaged friction clutch being in said maximum wear condition, the distance between the positions marked by said first and second elements is essentially equal to zero.

5. The clutch assembly according to claim 4, wherein:

said wear indicating device comprises a radially flexible dowel pin disposed in the axial direction of said release cylinder;

said second element is held in place along said dowel pin by friction; and said second element is displaceable on said dowel pin.

6. The clutch assembly according to claim 5, wherein:

said removable spacer element is secured one of: directly and indirectly, on said release cylinder, in particular on said dowel pin, by a bracket;

said actuator mechanism comprises a protective cap;

said actuator mechanism comprises a release piston disposed at least in part in said release cylinder;

said protective cap is disposed to externally cover a portion of said release piston which is extended outside of said release cylinder; and said protective cap comprises said first element.

7. A friction clutch assembly for a motor vehicle, the motor vehicle comprising a transmission, said clutch assembly comprising:

a friction clutch;

said friction clutch comprising:

a clutch disc defining an axis of rotation and an axial direction parallel to the axis of rotation;

a pressure plate to apply an axially directed force to said clutch disc to engage said clutch disc with a flywheel; and a biasing device to bias said pressure plate in the axial direction;

a release system to permit the engagement and disengagement of said friction clutch;

said release system being disposed to apply force to a portion of said biasing device;

said friction clutch having a new condition upon initial installation of said friction clutch;

said friction clutch having a maximum wear condition upon the occurrence of maximum allowable wear of said friction clutch;

said release system being disposed in a first position upon said friction clutch being in said new condition;

said release system being disposed in a second position upon said friction clutch being in said maximum wear condition;

said first position of said release system and said second position of said release system defining a distance between one another;

a device to indicate the amount of wear of said friction clutch;

said wear indicating device comprising:

an element to indicate wear disposed in a first position upon said friction clutch being in said new condition;

said element being disposed in a second position upon said friction clutch being in said maximum wear condition;

said first position of said element and said second position of said element defining a distance between one another;

said distance defined by said first position and said second position of said release system being essentially equal to said distance defined by said first position and said second position of said element;

said element being a first element to indicate wear;

said wear indicating device further comprising a second element to indicate wear;

said first element and said second element having an axial distance between one another;

said first element being designed and configured to move axially toward said second element upon the occurrence of wear of said friction clutch;

said distance between said first element and said second element being essentially zero upon said friction clutch being in said maximum wear condition;

an actuator mechanism;

said actuator mechanism being configured and disposed to move said release system;

said second element to indicate wear defining a predetermined position relative to the transmission of the vehicle;

said first element to indicate wear defining a predetermined position relative to said release system, such that the position defined by said first element to indicate wear moves toward the position defined by said second element to indicate wear upon the occurrence of wear of said friction clutch;

said friction clutch being a pulled clutch, and upon the released friction clutch having reached said maximum wear condition, the distance between the positions of said first and second elements is essentially equal to zero;

said actuator mechanism comprising a release piston; and said first element being configured and disposed to move with the release piston relative to the second element such that when the released friction clutch has reached said maximum wear condition, the distance by which the first element projects beyond the second element is essentially zero.

8. The clutch assembly according to claim 7, wherein:

said actuator mechanism comprises a surface facing away from said friction clutch which moves with said release piston;

said first element is one of: biased by a spring against said surface and fastened to said surface; and said first element can be displaced coaxially with respect to the second element.

9. The clutch assembly according to claim 7, wherein:

said second element is configured and disposed to be permanently inserted against a friction-tight clamping action in an extended position;

said actuator mechanism comprises a release cylinder;

said friction-tight clamping action being provided by a lug on said release cylinder;

said clutch assembly comprises a housing, said housing being configured and disposed to be stationary relative to the transmission; and said extended position being set upon one of: said housing being installed on said friction clutch, or upon the occasion of the first release of said friction clutch, such that the distance by which the first element projects beyond the second element corresponds to the maximum allowable wear travel of the friction clutch.

10. The clutch assembly according to claim 9, wherein:

said first element carries a driver element; and said driver element is configured and disposed to drive said second element into a permanent position upon one of: said housing is installed on said friction clutch, or upon said occasion of the first release of said friction clutch.

11. The clutch assembly according to claim 10, wherein:

said actuator mechanism comprises a radially biased dowel pin held on said release cylinder;

said dowel pin being clamped friction-tight, such that said dowel pin is movable in the axial direction of the friction clutch;

said dowel pin being configured and disposed to support said release piston in a release direction against axial forces occurring during installation of said release system on the friction clutch;

said clutch assembly comprising a ring-shaped release drive spring; and said axial forces comprising axial forces occurring when said ring-shaped release drive spring which is biased radially outward is pressed through a center opening of said friction clutch.

12. The clutch assembly according to claim 11, wherein:

said dowel pin comprises an end surface facing away from said friction clutch;

said first element is realized in the form of a slide;

said slide being disposed parallel to said dowel pin;

said slide comprises an end surface facing away from said friction clutch; and said slide being configured and disposed to move with said release piston, to permit said end surface of said slide and said end surface of said dowel pin to be separated from one another by a distance which corresponds to said maximum allowable wear travel of the friction clutch.

13. The clutch assembly according to claim 11, wherein;

said dowel pin comprises an end surface facing away from said friction clutch;

said housing has an opening;

said opening being of sufficient dimension to permit the application of a gauge to said release piston, upon said friction clutch being in a released state, to permit a comparison of the distance between said end surface of said dowel pin and a marking on said gauge, to permit the determination of the current wear of said friction clutch; and wherein said distance between said end surface and said marking is essentially zero when said friction clutch is in said maximum wear condition.

* * * * *

UNITED STATES PATENT AND TRADEMARK OFFICE
CERTIFICATE OF CORRECTION

PATENT NO. : 5,908,097
DATED : June 1, 1999
INVENTOR(S) : Wolfgang GROSSPIETSCH and Günter NEUGEBAUER It is certified that error appears in the above-indentified patent and that said Letters Patent is hereby corrected as shown below:

In column 1, line 37, after 'conditions', delete "it" and insert --in--.

Signed and Sealed this

First Day of February, 2000

Attest:

Attesting Officer

Q. TODD DICKINSON

Acting Commissioner of Patents and Trademarks